(12) United States Patent
Sasa

(10) Patent No.: US 7,163,970 B2
(45) Date of Patent: Jan. 16, 2007

(54) ACTINIC RAY CURABLE INK AND PRINTED MATTER UTILIZING THE SAME

(75) Inventor: Nobumasa Sasa, Sayama (JP)

(73) Assignee: Konica Minolta Holdings, Inc., Tokyo (JP)

( * ) Notice: Subject to any disclaimer, the term of this patent is extended or adjusted under 35 U.S.C. 154(b) by 165 days.

(21) Appl. No.: 10/718,408

(22) Filed: Nov. 20, 2003

(65) Prior Publication Data

US 2004/0102543 A1     May 27, 2004

(30) Foreign Application Priority Data

Nov. 22, 2002   (JP)   ............................. 2002-339005

(51) Int. Cl.
*C09D 11/02*   (2006.01)
*C08F 2/46*    (2006.01)
*C08D 3/28*    (2006.01)

(52) U.S. Cl. .......................... 523/160; 522/31; 522/32; 522/909

(58) Field of Classification Search ................ 523/160, 523/161, 400; 522/100, 909, 31, 32
See application file for complete search history.

(56) References Cited

U.S. PATENT DOCUMENTS

| | | | |
|---|---|---|---|
| 3,878,077 A | | 4/1975 | Borden et al. |
| 4,012,559 A | * | 3/1977 | Fujioka et al. .............. 428/463 |
| 5,889,084 A | * | 3/1999 | Roth .......................... 523/161 |
| 6,332,943 B1 | * | 12/2001 | Herrmann et al. .......... 156/277 |
| 6,783,840 B1 | * | 8/2004 | Watanabe et al. ........... 428/209 |
| 6,805,439 B1 | * | 10/2004 | Maeda et al. ................. 347/96 |
| 2003/0054103 A1 | * | 3/2003 | Sato et al. ................. 427/256 |
| 2004/0052968 A1 | * | 3/2004 | Takabayashi ............... 427/511 |

FOREIGN PATENT DOCUMENTS

| | | |
|---|---|---|
| GB | 2211791 | 7/1989 |
| GB | 2393965 | 4/2004 |
| JP | 07-053711 | 2/1995 |
| JP | 08-143806 | 6/1996 |
| JP | 2002-188025 | 7/2002 |
| JP | 2002-317139 | 10/2002 |

OTHER PUBLICATIONS

JP 04039367A (Showa) & WPI Abstraxt Acc.No. 1992-09363.
JP 02022370A (Nippon) & WPI Abstract Acc. No. 1990-070458.
JP 2002317139A (Riso Kagaku) & WPI Abstract Acc. No. 2003-270967.

* cited by examiner

*Primary Examiner*—Callie Shosho
(74) *Attorney, Agent, or Firm*—Lucas & Mercanti, LLP

(57) ABSTRACT

Actinic ray curable inks is disclosed. The ink contains at least one kind of epoxidized fatty acid ester or epoxidized fatty acid glyceride, as well as by further containing an oxetane compound, a cation polymerization initiator and a colorant.

13 Claims, No Drawings

ACTINIC RAY CURABLE INK AND PRINTED MATTER UTILIZING THE SAME

FIELD OF THE INVENTION

The present invention relates to cation polymerizing actinic ray curable ink and printed matter produced by the same.

BACKGROUND OF THE INVENTION

In recent years, inkjet recording methods have been applied in a variety of graphic arts fields such as photography, various kinds of printing, marking and color filters, since it can form images easily at low cost. Particularly, it is also possible to obtain image quality comparable to silver halide photography, by utilizing a recording apparatus which ejects and controls tiny ink dots, ink improved in the color reproduction range, durability and ejection suitability, and a specifically appropriate sheet which exhibits greatly improved ink absorption property, the coloring property of colorants, and surface glossiness. Improvement of image quality at this time has been achieved only by the complete set of various components of an apparatus, the ink and specifically appropriate sheets.

However, in an inkjet method requiring a specifically appropriate sheet, there are problems of limitation and increased cost of the recording medium. Therefore, many attempts have been made to record by means of an inkjet method onto a transferring medium different from the specifically appropriate sheets. Specific examples include a phase transition inkjet method which utilizes wax ink which is solid at room temperature, a solvent type inkjet method which utilizes rapid-drying ink mainly comprised of an organic solvent, and a ultraviolet (UV) inkjet method in which ink is cross-linked by UV light after recording.

Among these, the UV inkjet method has many advantages compared to the solvent type inkjet method resulting in its proliferation in recent years, and of such UV rays actinic ray curable inkjet ink is disclosed in Japanese Patent Publication No. 5-54667, JP-A No. 6-200204 (hereinafter, JP-A refers to Japanese Patent Publication Open to Public Inspection) and WO No. 2000-504778.

Actinic ray curable ink, which utilizes a compound as a vehicle curable by actinic rays such as UV rays, is superior in rapid drying characteristics, requires no heat drying process, also has advantages of no environmental contamination and exhibits greater safety due to being solvent free. Further, as polymerizing compounds used as a vehicle, widely utilized have been radical polymerizing types, which have a rapid curing rate, of which there are many kinds, however, a cation polymerizing compound has also been recently utilized, due to advantages such as it being only a little effected by oxygen, an effect which is unavoidable in radical polymerization, and of minimum shrinkage during curing.

A cation polymerizing compound includes typically various kinds of epoxy resins having an oxirane ring, and also reported (for example in patent literature 1–4) are compounds having an oxetane ring (hereinafter, referred to as "an oxetane compound").

However, the above-described cation polymerizing compounds are slow in curing rate and often result in inadequate curing. Further improvements have been sought in view of poor storage stability under high temperature environments. Further, pointed out is a concern of safety such as possible bad effects on the human body.

Patent Literature 1
   Japanese Patent No. 2679586 (Scope of Claims)

Patent Literature 2
   JP-A No. 8-143806 (Scope of Claims)

Patent Literature 3
   JP-A No. 2002-317139 (Scope of Claims)

Patent Literature 4
   JP-A No. 2002-188025 (Scope of Claims)

SUMMARY OF THE INVENTION

The present invention is presented in View of the above-described problems, and the objective is to provide cation polymerizing actinic ray curable ink being superior in pot life and handling safety; excellent in ejecting stability from recording heads and curing characteristics, when applied as inkjet ink; and to provide printed matter in which a high quality images can be formed on most kinds of recording materials as well as resulting in no wrinkling nor curling.

The above objective of this invention can be achieved by the following constitutions.

1. Actinic ray curable ink characterized by containing at least one kind of epoxidized fatty acid ester or epoxidized fatty acid glyceride.

2. The actinic ray curable ink described in item 1, characterized by further containing an oxetane compound, a cation polymerization initiator and a colorant.

3. The actinic ray curable ink described in item 2, characterized in that an addition ratio (A/B) of either one kind (A) of the above-described epoxidized fatty acid ester or epoxidized fatty acid glycerides to the above-described oxetane compound (B) is 1/9–9/1 by weight.

4. The actinic ray curable ink described in items 1–3 characterized by a viscosity at 23° C. being not more than 50 mPa.s.

5. Printed matter characterized in that an image is formed by depositing the actinic ray curable ink described in items 1–4 on a recording material.

DETAILED DESCRIPTION OF THE INVENTION

The inventors, as a result of extensive study in view of the above-mentioned problems, have found that provided can be cation polymerizing actinic ray curable ink being excellent in curing rate, storage stability under high temperature and high humidity, as well as safer handling by operators, and further provided can be printed matter without wrinkles and curl, by containing at least one kind of epoxidized fatty acid ester or epoxidized fatty acid glyceride in the actinic ray curable ink, and thereby they achieved this invention.

In addition to the above constitution, it has been found that the effects of this invention are exhibited more markedly by containing an oxetane compound, a cation polymerization initiator and a colorant, by setting the addition ratio (A/B), so that either one kind (A) of an epoxidized fatty acid ester or an epoxidized fatty acid glycerides, to an oxetane compound (B) to be 1/9–9/1 by weight, and by adjusting the viscosity at 23° C. to be not more than 50 mPa.s.

In the following, this invention will be detailed.

Actinic ray curable ink (hereinafter, also simply referred to as ink) of this invention is characterized by containing at least one kind of epoxidized fatty acid ester or epoxidized fatty acid glyceride.

Epoxidized fatty acid ester or epoxidized fatty acid glyceride according to this invention can be utilized without specific limitation as long as an epoxy group is introduced in fatty acid ester or fatty acid glyceride.

Epoxidized fatty acid ester includes, for example, such esters as epoxy methyl stearate, epoxy butyl stearate and epoxy octyl stearate which are prepared by epoxidation of oleic acid ester.

Further, epoxidized fatty acid glyceride can include epoxidized fat and oil which are prepared by epoxidation of fat and oil containing unsaturated fatty acid, such as for example, epoxidized soybean oil, epoxidized castor oil and epoxidized safflower oil, which are prepared by epoxidation of soybean oil, linseed oil and castor oil.

The content of epoxidized fatty acid ester or epoxidized fatty acid glyceride, of this invention, in ink is preferably 10–80 weight % and more preferably 10–50 weight %.

Actinic ray curable ink of this invention preferably contains an oxetane compound, a cation polymerization initiator and a colorant in addition to the above epoxidized fatty acid ester or epoxidized fatty acid glyceride.

An oxetane compound is a compound having one or more oxetane rings in the molecule. Specifically preferably utilized are 3-ethyl-3-hydroxymethyl oxetane (such as OXT101, manufactured by Toa Gosei Co. Ltd.), 1,4-bis[(3-etyl-3-oxetanyl) methoxymethyl] benzene (such as OXT121, manufactured by Toa Gosei Co. Ltd.), 3-ethyl-3-(phenoxymethyl) oxetane (such as OXT211, manufactured by Toa Gosei Co. Ltd.), di(1-ethyl-3-oxetanyl) methylether (such as OXT221, manufactured by Toa Gosei Co. Ltd.) and 3-ethyl-3-(2-ethylhexyloxymethyl) oxetane (such as OXT212, manufactured by Toa Gosei Co. Ltd.), and specifically preferably utilized are 3-etyl-3-hydroxymethl oxetane, 3-ethyl-3-(phenoxymethyl) oxetane and di(1-ethyl-3-oxetanyl) methyl ether. These can be utilized alone or in combinations of two or more kinds.

In this invention, the addition ratio (A/B) of either one kind (A) of the above-described epoxidized fatty acid esters or epoxidized fatty acid glycerides, to the above-described oxetane compound (B) is preferably 1/9–9/1 by weight.

That is, when the total addition amount of either one kind (A) of epoxidized fatty acid ester or epoxidized fatty acid glyceride, and the above-described oxetane compound (B) is 100 weight parts, an addition amount of either one kind (A) of epoxidized fatty acid ester or epoxidized fatty acid glyceride is preferably at least 10 weight parts, more preferably at least 15 weight parts and specifically preferably at least 25 weight parts, with respect to securing excellent curing characteristics and storage stability under high temperature. Further, the blending amount of an oxetane compound is preferably at least 10 weight parts, more preferably at least 15 weight parts and specifically preferably at least 25 weight parts, with respect to ink ejection characteristics from an inkjet recording head, and absence of wrinkles and curl on printed matter.

As a cation polymerization initiator usable in this invention, preferably utilized can be cation polymerization initiators well known in the art, for example, diazonium salt, iodonium salt, sulfonium salt, an iron allene complex and an organic polyhalogenide compound. Diazonium salt, iodonium salt, and sulfonium salt include compounds described in Japanese Patent Publication Nos. 54-14277 and 54-14278, JP-A 51-56885, U.S. Pat. Nos. 3,708,296 and 3,853,002.

Suitable compounds in this invention will be listed below.

Firstly, listed can be $B(C_6F_6)_4^-$, $PF_6^-$, $AsF_6^-$, $SbF_6^-$ and $CF_3SO_3^-$ salts of aromatic onium compounds such as diazonium, iodonium, sulfonium and phosphonium. A compound having a borate compound as a counter anion is preferable due to high capability of acid generation. Specific examples of an onium compound are shown below:

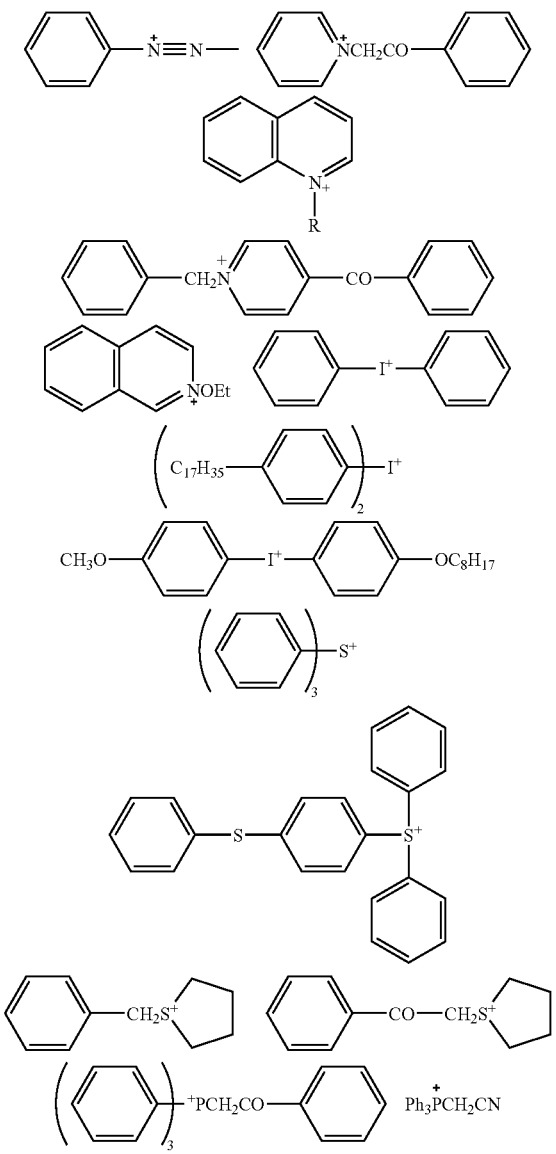

Secondly, listed can be a sulfonate which generates sulfonic acid. Specific examples of the compound are shown below:

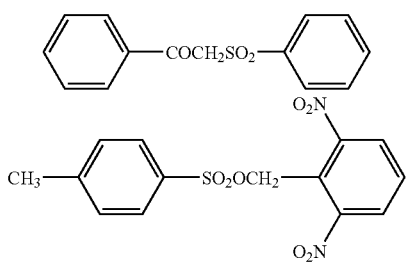

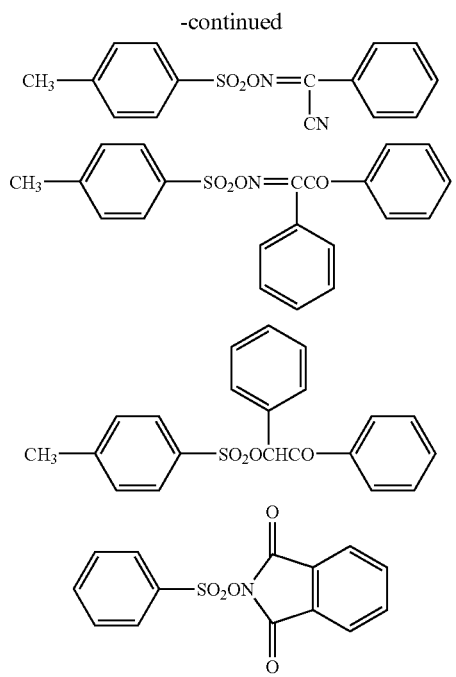

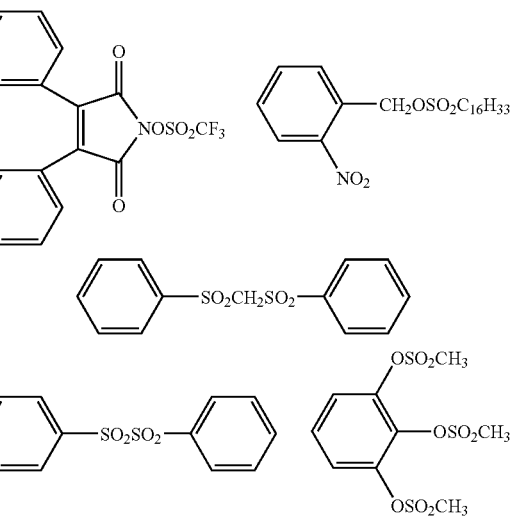

Thirdly, also utilized can be a halogenide which can generate a hydrogen halogenide. Specific exemplary compounds are shown below:

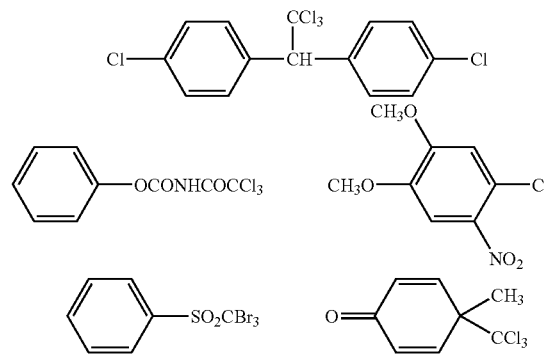

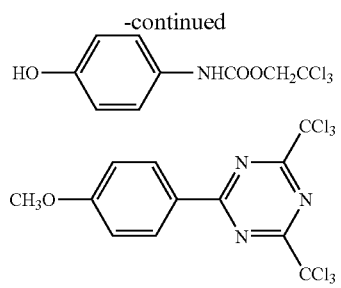

Fourthly, an iron allene complex can be listed.

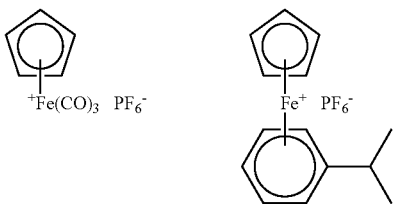

As for a cation polymerization initiator other than the compounds described above, utilized can be photo-induced acid generating compounds described in "Molecular Design of Super LSI Resist", 1990, pp. 55–78, by Yuzuru Tsuda, published by Kyoritsu Shuppan. In this invention, the content of a cation polymerization initiator in an ink composition is preferably 0.1–20.0 weight %, more preferably 1.0–10.0 weight % and specifically preferably 2.0–4.0 weight %.

A colorant usable in this invention includes a pigment or a dye, as well as combinations of two or more kinds thereof.

As a pigment, preferably utilized can be, for example, organic pigments (Brilliant Carmine 6B, Lake Red C, Watching Red, Disazo Yellow, Hansa Yellow, Phthalocyanine Blue, Phthalocyanine Green, Alkali Blue, Aniline Black, etc.) such as an azo type, a phthalocyanine type, a dye type, a condensed ring type, a nitro type and a nitroso type; in addition to metals such as cobalt, iron, chromium, copper, zinc, lead, titanium, vanadium, manganese and nickel; metal oxide and metal sulfide; inorganic pigments such as loess, ultramarine and Prussian blue; and carbon black series such as furnace carbon black, lamp black, acetylene black and channel black.

Pigments preferably utilized in this invention are listed below:
 C.I. Pigment Yellow—1, 3, 12, 13, 14, 17, 81, 83, 87, 95, 109, 42,
 C.I. Pigment Orange—16, 36, 38,
 C.I. Pigment Red—5, 22, 38, 48:1, 48:2, 48:4, 49:1, 53:1, 57:1, 63:1, 144, 146, 185, 101,
 C.I. Pigment Violet—19, 23,
 C.I. Pigment Blue—15:1, 15:3, 15:4, 4, 18, 60, 27, 29,
 C.I. Pigment Green—7, 36,
 C.I. Pigment White—6, 18, 21,
 C.I. Pigment Black—7

As dyes, utilized can be, for example, oil soluble dyes such as an azo type, an anthraquinone type and an azine type.

In this invention, either a pigment or a dye can be utilized as a colorant, however, a pigment is preferred with respect to preparing ink also having excellent light fastness. The content of a colorant is preferably not more than 10 weight % and more preferably 2–7 weight %.

Incidentally, in actinic ray curable inks of this invention, utilized as other cation polymerizing compounds other than above-described components can be alicyclic epoxy resin [for example, 3,4-epoxy cyclohexylmethyl 3',4'-epoxy cyclohexane carboxylate, bis(3,4-epoxy cyclohexylmethyl) adipate, ε-caprolactone modified 3,4-epoxy cyclohexylmethyl 3',4'-epoxy cyclohexane carboxylate, 1-methyl-4-(2-methyloxylanyl)-7-oxabicyclo[4,4,0]heptane, etc.], epoxy resins other than alicyclic (for example, bisphenol type resins such as a bisphenol A type resin and a bisphenol F type resin, novolak type epoxy resins such as a phenol novolak type epoxy resin and a cresol novolak type epoxy resin, aromatic epoxy resins such as a naphthalene type epoxy resin, etc.), a diglycidyl ether series of a polyol, a vinylether series, a cyclic lactone series, a cyclic carbonate series, a spiro orthoester series and a spiro orthocarbonato series.

Further, contained may be a compound which includes a reactive functional group such as a radical polymerizing functional group other than a cation polymerizing group, in a range not to disturb the desired effects of this invention.

In actinic ray curable ink of this invention, further appropriately contained may be commonly known components such as an anti-oxidant, an anti-bacteria anti-mold agent, a pigment dispersant, a polymerization inhibitor, a surfactant and a pH regulating agent.

Actinic ray curable inks of this invention comprised of each of the above components can be prepared, for example, by use of commonly known dispersing apparatus such as a bead mill, a dispermixer, a homomixer, a colloidal mill, a ball mill, an attritor and a sand mill.

In this invention, actinic ray curable inks having a viscosity at 23° C. of not more than 50 mPa.s is preferably utilized. When the ink viscosity is over 50 mPa.s, ink ejection characteristics from a recording head deteriorate when an inkjet head is heated in even the range of causing no thermal modification of the ink.

In this invention, the inkjet recording method is to eject tiny ink droplets through a nozzle and deposit them onto a recording material such as paper, resulting in excellent image quality and excellent prints.

Various methods are proposed as an inkjet recording method, and a method called a continuous method is disclosed, for example, in U.S. Pat. Nos. 3,298,030 and 3,596,275. Further, as a drop-on-demand method, a method in which deformation of a piezo device is applied as a driving force of ink ejection is disclosed, for example, in U.S. Pat. No. 3,946,398. An inkjet recording method in which ink drops are ejected by utilizing thermal energy is also disclosed, for example, in U.S. Pat. No. 4,251,824.

In this invention, actinic ray irradiation is performed after ink of this invention has been adhered on a recording material by any of the inkjet recording methods described above. Ink starts a polymerization reaction so that the ink composition adheres on a printing medium to result in printed matter.

In this invention, actinic rays for curing may be any having the energy to generate protons or carbonium ions (carbo-cation), and specific examples thereof include electromagnetic waves such as ultraviolet rays, X-rays and γ-rays. Among these, ultraviolet ray curable ink is preferably utilized with respect to such factors as absorption wave length of the cation polymerization initiator, availability of resin and an irradiation apparatus. In this case, utilized as a light source can be such as a high-pressure mercury lamp, a metal halide lamp, a xenon lamp and a black light. Further, in cases of applying to an inkjet printer, ultraviolet light can also be irradiated immediately after printing by arranging an optical fiber adjacent to the inkjet head and moved synchronously with the motion of the head, by use of for example Optical Modulex, available from Ushio Inc.

Recording materials utilizable for printed matter of this invention are, for example, metals such as aluminum, iron and copper; plastics such as vinyl chloride, acryl, polycarbonate, polyethylene terephthalate, acrylonitrile-butadiene-styrene copolymer, polyethylene and polypropylene; ceramic such as glass; wood; paper; printing paper and fiber. Preferable recording material of this invention is a non-porous recording material in which ink is not absorbed.

EXAMPLES

This invention will now be further detailed using examples, however, this invention is-not limited thereto, unless it deviates from the technological idea of the invention.

<Preparation of Ink>

Each constitutional component described in Table 1 is mixed, being dispersed using a bead mill, and filtered using a filter to prepare inks 1–6.

Herein, details of each compound described in Table 1 follow:

S-300K: Daimac S-300K, manufactured by Daicel Chemical Industries, Ltd., being epoxidized soybean oil O-130P: Adekasizer O-130P, manufactured by Asahi Denka Kogyo K. K., being epoxidized soybean oil D-55: Adekasizer D-55, manufactured by Asahi Denka Kogyo K. K., being an iso-butyl ester of epoxidized rape oil E-4030: Sansosizer E-4030, manufactured by Shin-Nippon Rika Co., Ltd., being an epoxidized fatty acid butyl OXT221: manufactured by Toagosei Co., Ltd., being an oxetane compound EX221: Denacol EX211, manufactured by Nagase Chemicals Co., Ltd., being an epoxy resin CEL3000: manufactured by Daicel Chemical Industries Co., Ltd., being an alicyclic epoxy resin SP152: manufactured by Asahi-Denka Kogyo K. K., a cation polymerization initiator (more specifically a triaryl sulfonium salt compound)

MA11: manufactured by Mitsubishi Chemical Corp., Ltd., being a pigment

TABLE 1

| Ink No. | Epoxidized Fatty Acid Compound Kind | Epoxidized Fatty Acid Compound Addition Amount | Oxetane Compound Kind | Oxetane Compound Addition Amount | Other Expoxy Resin Kind | Other Expoxy Resin Addition Amount | Polymerization Initiator Kind | Polymerization Initiator Addition Amount | Colorant Kind | Colorant Addition Amount | Ink viscosity mPa·s | Remarks |
|---|---|---|---|---|---|---|---|---|---|---|---|---|
| 1 | S-300K | 11.0 | OXT221 | 84.0 | — | — | SP152 | 3.0 | MA11 | 2.0 | 50 | Inv. |
| 2 | O-130P | 20.0 | OXT221 | 75.0 | — | — | SP152 | 3.0 | MA11 | 2.0 | 46 | Inv. |
| 3 | E-4030 | 40.0 | OXT221 | 55.0 | — | — | SP152 | 3.0 | MA11 | 2.0 | 35 | Inv. |
| 4 | D-55 | 84.0 | OXT221 | 11.0 | — | — | SP152 | 3.0 | MA11 | 2.0 | 35 | Inv. |
| 5 | — | — | OXT221 | 75.0 | EX221 | 20.0 | SP152 | 3.0 | MA11 | 2.0 | 20 | Comp. |
| 6 | — | — | OXT221 | 11.0 | CEL3000 | 84.0 | SP152 | 3.0 | MA11 | 2.0 | 17 | Comp. |

Inv.; Invention
Comp.; Comparison

<Image Formation and Curing>

Each of the inks prepared above was loaded into a partly modified Inkjet Printer Phaser860 (produced by Phaser Printing Japan Co.), and was ejected from an inkjet head heated at 50° C. onto polypropylene film and polyethylene terephthalate film, used as recording materials to form a solid image. After ejection, curing was performed by curing method 1 in which an image was irradiated employing a high-pressure mercury lamp (80 W) while transported at a belt rate of 1000 mm/sec, and by curing method 2 in which an image was irradiated with a black light (20 W) while transported at a belt rate of 500 mm/sec.

<Evaluation of Each Characteristic>

Each evaluation was made using the following method with respect to ink prepared in the foregoing manner, the printed image and the ejection state at the time of image formation.

<Evaluation of Ink Storage Stability>

After the viscosity, at 23° C., of each ink prepared as above was measured by use of a vibration viscometer, Viscometer VM-1G-MH (produced by Yamaichi Co., Ltd), each ink was put into a sealable glass bottle to be stored at 55° C. for 1 week, after which, a viscosity, at 23° C. of the ink composition, was measured in a similar manner to evaluate ink storage stability based on the following criteria.

A: Viscosity variation between before and after storage is less than 2.0 mPa.s.

B: Viscosity variation between before and after storage is at least 2.0 mPa.s but less than 5.0 mPa.s.

C: Viscosity variation-between before and after storage is more than 5.0 m Pa.s.

<Evaluation of Safety>

Each ink sample was adhered onto living human skin and sensory evaluation was performed to judge safety based on the following criteria.

A: No change to the skin was observed when ink was adhered.

B: Skin turned reddish when ink was adhered.

C: Blisters were resulted on the skin when ink was adhered.

<Evaluation of Ejection Stability>

After continuous ejection of 1 hour under the above-described conditions, ejection properties of ink drops from the inkjet recording head and the state of images formed were visually observed to judge ejection stability based on the following criteria.

A: Stable ejection of ink without any deterioration of images,

B: Some unevenness or variation in ejection of ink drops, and partially deteriorated images, C: Ink ejection was impossible.

<Evaluation of Curing Characteristics>

The following evaluation was performed with respect to solid images having been cured by the foregoing curing methods 1 and 2.

Curing characteristics of a cured image were judged by finger touch and evaluated based on the following criteria.

A: A solid image having been subjected to a curing process was mostly cured and no uncured portion was noted, B: Partially uncured portions of the solid image having been subjected to a curing process were observed, however, the print are commercially viable, C: Almost all portions of the solid image having been subjected to a curing process were uncured.

<Evaluation of Wrinkling and Curling of Printed Matter>

Ink was ejected onto polypropylene (PP) film and onto polyethylene terephthalate film (PET) to result in a dry layer thickness of 10 μm, after having been cured by curing method 1, wrinkles and curl generated on each film were visually observed and evaluated based on the following criteria.

A: Both PP and PET had no wrinkles and curl resulting in an excellent print,

B: Both PP and PET had some wrinkles and curl, however, were commercially viable, C: Both PP and PET had significant wrinkles and curl, and were not commercially viable.

Results obtained above are shown in Table 2.

TABLE 2

| Ink No. | Ink Storage Stability | Safety | Ejection Stability | Curing Characteristics Curing Method 1 | Curing Characteristics Curing Method 1 | Wrinkles and Curl of Printed Matter | Remarks |
|---|---|---|---|---|---|---|---|
| 1 | A | A | A | A | A | A | Inv. |
| 2 | A | A | A | A | A | A | Inv. |
| 3 | A | A | A | A | A | A | Inv. |
| 4 | A | A | A | A | A | A | Inv. |
| 5 | C | C | B | B | B | C | Comp. |
| 6 | C | B | B | B | B | C | Comp. |

Inv.; Invention
Comp.; Comparison

It is clear from Table 2 that inks of this invention containing epoxidized fatty acid ester or epoxidized fatty acid glyceride can provide high quality printed matter, which is superior in ink storage stability and safe for humans, as well as being excellent in ejection stability during inkjet image formation and in curing characteristics, and generates no wrinkles or curl.

EFFECT OF THE INVENTION

This invention can provide cation polymerization actinic ray curable inks which are superior in ink storage stability and safe for humans, as well as being excellent in ejection stability from a recording head and in curing characteristics when utilized as an inkjet ink; and results in printed matter without wrinkles and curl.

The invention claimed is:

1. An actinic ray curable ink comprising a colorant, an epoxidized fatty acid ester or an epoxidized fatty acid glyceride and an oxetane compound,
wherein a viscosity of the ink at 23° C. is not more than 50 mPa.s.

2. The actinic ray curable ink of claim 1, wherein the epoxidized fatty acid ester is epoxy methyl stearate, epoxy butyl stearate or epoxy octyl stearate.

3. The actinic ray curable ink of claim 1, wherein the epoxidized fatty acid glyceride is a compound selected from the group consisting of epoxidized soybean oil, epoxidized castor oil and epoxidized safflower oil.

4. The actinic ray curable ink of claim 1, wherein content of epoxidized fatty acid ester or epoxidized fatty acid glyceride is 10–80 weight % based on the total weight of the ink.

5. The actinic ray curable ink of claim 4, wherein content of epoxidized fatty acid ester or epoxidized fatty acid glyceride is 10–50 weight % based on the total weight of the ink.

6. The actinic ray curable ink of claim 1, wherein a ratio (A/B) of the epoxidized fatty acid ester or epoxidized fatty acid glycerides (A) to the oxetane compound (B) is 1/9–9/1 by weight.

7. Printed matter wherein an image is formed by depositing the actinic ray curable ink of any one of claim 1 on a recording material.

8. The actinic ray curable ink of claim 1, wherein the ink further comprises a cation polymerization initiator.

9. The actinic ray curable ink of claim 8, wherein the cation polymerization initiator is selected from the group consisting of diazonium salt, iodonium salt, sulfonium salt, an iron allene complex and an organic polyhalogenide compound.

10. The actinic ray curable ink of claim 1, wherein the oxetane compound is selected from the group consisting of 3-ethyl-3-hydroxymethyl oxetane, 1,4-bis[(3-ethyl-3-oxetanyl) methoxymethyl] benzene, 3-ethyl-3-(phenoxymethyl) oxetane, di(1-ethyl-3-oxetanyl) methyl ether and 3-ethyl-3-(2-ethyihexyloxymethyl) oxetane.

11. The actinic ray curable ink of claim 10, wherein the oxetane compound is selected from the group consisting of 3-ethyl-3-hydroxymethyl oxetane, 3-ethyl-3-(phenoxymethyl) oxetane and di(1-ethyl-3-oxetanyl) methyl ether.

12. An ink-jet image forming method comprising:
ejecting an ink through an ink jet head to recording materials, wherein the ink is an actinic ray curable ink of claim 1.

13. An actinic ray curable ink comprising:
a colorant;
a cation polymerization initiator;
an oxetane compound; and
an epoxidized fatty acid glyceride selected from the group consisting of epoxized soybean oil, epoxized caster oil, and epoxized safflower oil;
wherein a viscosity of the ink at 23° C. is not more than 50 mPa.s.

* * * * *